United States Patent
Meverden

(10) Patent No.: US 6,444,765 B1
(45) Date of Patent: Sep. 3, 2002

(54) OLEFIN POLYMERIZATION PROCESS FOR PRODUCING BROAD MWD POLYMERS

(75) Inventor: Craig C. Meverden, Mason, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 09/593,875

(22) Filed: Jun. 14, 2000

(51) Int. Cl.[7] .................................. C08F 4/44
(52) U.S. Cl. ................. 526/153; 526/170; 526/131; 526/160; 526/151; 502/114; 502/103
(58) Field of Search ................ 526/160, 159, 526/170, 153, 131, 943

(56) References Cited

U.S. PATENT DOCUMENTS

| | | | | |
|---|---|---|---|---|
| 4,414,369 A | | 11/1983 | Kuroda et al. ................. 526/65 |
| 4,461,873 A | | 7/1984 | Bailey et al. ................. 525/240 |
| 4,530,914 A | | 7/1985 | Ewen et al. ................. 502/113 |
| 4,703,094 A | | 10/1987 | Raufast ........................ 526/65 |
| 4,937,299 A | | 6/1990 | Ewen et al. ................. 526/119 |
| 5,032,562 A | | 7/1991 | Lo et al. ..................... 502/111 |
| 5,444,134 A | * | 8/1995 | Matsumoto ................. 526/159 |
| 5,498,582 A | * | 3/1996 | Krause et al. ............... 502/103 |
| 5,539,076 A | | 7/1996 | Nowlin et al. ............ 526/348.1 |
| 5,554,775 A | | 9/1996 | Krishnamurti et al. ......... 556/7 |
| 5,783,512 A | * | 7/1998 | Jacobsen et al. ............. 502/124 |
| 5,902,866 A | | 5/1999 | Nagy et al. .................. 526/133 |
| 5,985,784 A | * | 11/1999 | Winter et al. ................ 502/113 |
| 6,107,230 A | * | 8/2000 | McDaniel et al. ........... 502/104 |
| 6,153,551 A | * | 11/2000 | Kissin et al. ................ 502/110 |
| 6,201,076 B1 | * | 3/2001 | Etherton et al. .............. 526/74 |
| 6,211,311 B1 | * | 4/2001 | Wang et al. ................. 526/131 |
| 6,403,736 | * | 6/2001 | Wang .......................... 526/160 |
| 6,291,386 B1 | * | 9/2001 | Wang .......................... 502/124 |

FOREIGN PATENT DOCUMENTS

| EP | 0719797 A2 | 7/1996 |
|---|---|---|
| WO | WO 97/23512 | 7/1997 |

* cited by examiner

*Primary Examiner*—David W. Wu
*Assistant Examiner*—Rip A Lee
(74) *Attorney, Agent, or Firm*—Kevin M. Carroll

(57) ABSTRACT

An olefin polymerization process is described. The process comprises preparing a catalyst system by premixing a first organoaluminum with a supported boraaryl catalyst and then polymerizing an olefin in the presence of the premixed supported catalyst, an activator and a second organoaluminum. The process produces polyolefins having broad and/or bimodal molecular weight distributions compared to the process in which either the first or the second organoaluminum is not used.

9 Claims, No Drawings

OLEFIN POLYMERIZATION PROCESS FOR PRODUCING BROAD MWD POLYMERS

FIELD OF THE INVENTION

This invention relates to a process for preparing polyolefins. The process comprises a first step of premixing a supported boraaryl catalyst with an organoaluminum, followed by olefin polymerization in the presence of the premixed catalyst, an activator, and a second organoaluminum. The organoaluminums may be the same or different. The process is surprisingly useful for the preparation of broad and/or bimodal molecular weight distribution polyolefins.

BACKGROUND OF THE INVENTION

Interest in metallocene and non-metallocene single-site catalysts has continued to grow rapidly in the polyolefin industry. These catalysts are more active than conventional Ziegler-Natta catalysts, and they produce polymers with improved physical properties. The improved properties include narrow molecular weight distribution, reduced low molecular weight extractables, enhanced incorporation of α-olefin comonomers, and lower polymer density. Examples of non-metallocene single-site catalysts include catalysts containing a boraaryl moiety such as borabenzene, boranaphthalene or boraphenanthrene. See U.S. Pat. No. 5,554,775 and PCT Int. Appl. WO 97/23512.

Unfortunately, the uniformity of molecular weight distribution (MWD) reduces the thermal processing ability of polyolefins made with single-site catalysts. These polyolefins also have a higher tendency to melt fracture, especially at higher molecular weights. These disadvantages combine to make it difficult to process polyolefins produced by single-site catalysts under conditions normally used for Ziegler-Natta polymers. Controllable broadening of MWD is therefore a desired advance in single-site catalyst technology.

One method of increasing processability and broadening MWD of polyolefins produced by single-site catalysts is to physically mix two or more different polyolefins to produce a blended polyolefin mixture with a multimodal, broad molecular weight distribution. For example, see U.S. Pat. No. 4,461,873. In addition, olefin polymerization has been performed in a dual reactor system in order to broaden MWD. The olefin is polymerized by a catalyst in one reactor under one set of conditions, and then the polymer is transferred to a second reactor under a different set of conditions. The first reactor typically produces a high-molecular-weight component, and the second reactor produces a low-molecular-weight component. See U.S. Pat. Nos. 4,338,424, 4,414,369, 4,420,592, and 4,703,094. Lastly, a one-reactor, two-catalyst process has also been used to make multimodal, broad-MWD polymers. The olefin is polymerized in one reactor by two catalysts with different reactivity to form a reactor blend having broad and/or multimodal molecular weight distribution. The catalysts may be either two (or more) separate metallocenes or a metallocene and a Ziegler-Natta component. See, for example, U.S. Pat. Nos. 4,937,299 and 4,530,914, in which at least two separate metallocenes are used in one reactor to form multimodal polymers. See U.S. Pat. Nos. 5,032,562 and 5,539,076 for examples of the metallocene/Zeigler-Natta catalyst mixture in one reactor.

A significant disadvantage of each of these methods is the added cost of using two reactors or two catalysts in the polymerization process. A simpler method would use a single catalyst system that produces broad MWD polymers in a one-reactor process. For example, EP 719,797 A2 discloses an olefin polymerization process in which conventional metallocenes and at least two different co-catalysts are used to produce broad/bimodal MWD polyolefins. In addition, copending application Ser. No. 09/439,462 (U.S. Pat. No. 6,294,626) discloses a method for producing broad and/or bimodal polyolefins using a catalyst comprising an activator and an organometallic compound that incorporates a modified boraaryl ligand.

In sum, new processes are needed. Particularly valuable processes are those that would use one catalyst to produce broad MWD polyolefins having greater thermal processing ability.

SUMMARY OF THE INVENTION

The invention is a process for polymerizing olefins. The process comprises preparing a catalyst system by reacting a first organoaluminum with a supported boraaryl catalyst and then polymerizing an olefin in the presence of the premixed catalyst, an activator and a second organoaluminum. The process surprisingly leads to the production of broad MWD polyolefins. The results are particularly surprising since co-pending U.S. application Ser. No. 09/318,009 (U.S. Pat. No. 6,291,386) teaches that olefin polymerization with a boraaryl catalyst produces polyolefins with narrow MWD when organoaluminums are added to the reactor, without a premixing step.

DETAILED DESCRIPTION OF THE INVENTION

The process of the invention comprises: (a) preparing a catalyst system by premixing a first organoaluminum with a supported catalyst comprising a support and an organometallic compound comprising a Group 3-10 transition or lanthanide metal, M, and at least one boraaryl ligand; and (b) polymerizing an olefin in the presence the catalyst system of step (a), an activator, and a second organoaluminum. The second organoaluminum may be the same as or different from the first organoaluminum.

The supported catalyst of the invention comprises a support and an organometallic compound. The organometallic compound useful in the invention contains at least one boraaryl ligand. Suitable boraaryl ligands include substituted or unsubstituted boraaryl groups, such as substituted or unsubstituted borabenzenes, boranaphthalenes or boraphenanthrenes, as described in U.S. Pat. No. 5,554,775, the teaching of which is incorporated herein by reference. The metal, M, may be any Group 3 to 10 transition or lanthanide metal. Preferably, the catalyst contains a Group 4 to 6 transition metal; more preferably, the catalyst contains a Group 4 metal such as titanium or zirconium.

The transition or lanthanide metal may also have other polymerization-stable anionic ligands. Suitable ligands include cyclopentadienyl (substituted or unsubstituted) anions such as those described in U.S. Pat. Nos. 4,791,180 and 4,752,597, the teachings of which are incorporated herein by reference. Suitable ligands also include another boraaryl group or a substituted or unsubstituted azaborolinyl, pyrrolyl, indolyl, quinolinyl, hydroxypyridinyl, or aminopyridinyl group as described in U.S. Pat. Nos. 5,554,775, 5,539,124, 5,637,660, and 5,902,866, the teachings of which are also incorporated herein by reference.

The boraaryl ligand and the other polymerization-stable anionic ligand can be bridged. Groups that can be used to bridge the ligands include, for example, methylene, ethylene, 1,2-phenylene, dialkylsilyls, and diarylsilyls. Normally, only a single bridge is used in the single-site catalyst, but complexes with two bridging groups can be used. Bridging the ligand changes the geometry around the transition metal and can improve catalyst activity and other properties, such as molecular weight, comonomer incorporation, and thermal stability.

Other suitable ligands include halides and $C_1$–$C_{20}$ alkoxy, siloxy, or dialkylamido ligands. Particularly preferred ligands are halides.

The organometallic compound is immobilized on a support to form the supported catalyst of the invention. The support is preferably a porous material. The support can be inorganic oxides, inorganic chlorides, and organic polymer resins, or mixtures thereof. Preferred inorganic oxides include oxides of Group 2, 3, 4, 5, 13, or 14 elements. Preferred inorganic chlorides include chlorides of the Group 2 elements. Preferred organic polymer resins include polystyrene, styrene-divinylbenzene copolymers, and polybenzimidizole. Particularly preferred supports include silica, alumina, silica-aluminas, magnesias, titania, zirconia, magnesium chloride, and polystyrene.

Preferably, the support has a surface area in the range of about 10 to about 700 $m^2/g$, more preferably from about 50 to about 500 $m^2/g$, and most preferably from about 100 to about 400 $m^2/g$. Preferably, the pore volume of the support is in the range of about 0.1 to about 4.0 mL/g, more preferably from about 0.5 to about 3.5 mL/g, and most preferably from about 0.8 to about 3.0 mL/g. Preferably, the average particle size of the support is in the range of about 10 to about 500 μm, more preferably from about 20 to about 200 μm, and most preferably from about 10 to about 100 μm. The average pore diameter is typically in the range of about 10 to about 1000 Å, preferably about 20 to about 500 Å, and most preferably about 50 to about 350 Å.

The organometallic compound is supported using any of a variety of immobilization techniques. In one method, organometallic compound is dissolved in a solvent and combined with the support. Evaporation of the solvent gives a supported catalyst. An incipient wetness method can also be used.

The support can be used without any pre-treatment prior to immobilization of the organometallic compound, but a support pre-treatment step is preferred. The support may be calcined and/or modified by a chemical additive. If the support is pre-treated by calcination, the calcination temperature is preferably greater than 150° C. The chemical additives used to pre-treat the support include triaklylaluminums, alumoxanes, organoboranes, organomagnesiums, organosilanes, and organozinc compounds. Support modification techniques are taught in U.S. Pat. Nos. 4,508,843, 4,530,913, and 4,565,795, the teachings of which are incorporated herein by reference.

Preferably, the support is silylated prior to use. Silylation is used to remove acidic sites from the support surface. Silylation is performed by reacting the support with a silylating agent, either in solution by incipient wetness or impregnation, or in the vapor phase. Preferred silylating agents include alkylsilyl halides, alkyldisilazanes, alkyl and aryl alkoxysilanes. Preferred alkylsilyl halides include trialkylsilyl halides, dialkylsilyl dihalides, and alkylsilyl trihalides, which preferably have the formula $R^3R^4R^5SiX$, $R^3R^4SiX_2$ or $R^3SiX_3$. Particularly preferred alkylsilyl halides are trimethylchlorosilane, dimethyldichlorosilane, t-butyldimethylchlorosilane, and trimethylsilyl iodide.

Suitable alkyl disilazanes include hexaalkyl disilazanes having the formula $R^3{}_3SiNHSiR^3{}_3$. In particular, hexamethyldisilazane is preferred.

Preferred alkyl or aryl alkoxysilanes include trialkyl alkoxysilanes, dialkyl dialkoxysilanes, and alkyl trialkoxysilanes, which preferably have the formula $R^3R^4R^5Si(OR^6)$, $R^3R^4Si(OR^5)(OR^6)$ or $R^3Si(OR^4)(OR^5)(OR^6)$ where $R^3$, $R^4$, $R^5$, and $R^6$ denote the same or different $C_1$–$C_{20}$ hydrocarbyl. Exemplary alkyl alkoxysilanes are cyclohexylmethyldimethoxysilane, methyltrimethoxysilane, methyltriethoxysilane, phenyltriethoxysilane, and dicyclopentyldimethoxysilane.

Optionally, the support can be treated with an organoboron compound following silylation. Preferred organoboron compounds include trialkylborons, triarylborons, and trialkoxyborons having the formula $R^3R^4R^5B$ or $B(OR^3)(OR^4)(OR^5)$. Most preferred are trimethylboron, triethylboron, tripropylboron, triisobutylboron, trimethoxyboron, triethoxyboron, tripropoxyboron, and triphenoxyboron.

The organoboron compound is added to the support in an amount preferably in the range of about 0.1 to 10 mmoles of boron per gram of support, more preferably from about 0.2 to 5 mmoles/gram, and most preferably from about 0.5 to 3 mmoles/gram. Treatment with the organoboron compound may be performed in either the liquid phase or in the vapor phase. In the liquid phase, the organoboron compound is applied to the support as a liquid, either by itself or as a solution in a suitable solvent such as a hydrocarbon. In the vapor phase, the organoboron compound is contacted with the support in the form of a gas or by injecting liquid modifier into the preheated support to vaporize the modifier. Treatment temperatures are preferably in the range of from about 20° C. to about 400° C. The organoboron treatment step can be carried out in a batch, semi-continuous, or continuous manner.

The support is preferably heated at a temperature from about 50° C. to about 1000° C., more preferably from about 100° C. to about 800° C., either before or after the organoboron modification. In another method, the support heat treatment and organoboron modification occur simultaneously as the organoboron compound in the vapor phase is passed over a heated support as discussed above.

Before addition into the olefin polymerization reactor, the supported catalyst is premixed with a first organoaluminum to form the catalyst system of the invention. The first organoaluminum is a trialkyl or triaryl aluminum compound, which preferably has the formula $AlR^1{}_3$ where $R^1$ denotes a $C_1$–$C_{20}$ hydrocarbyl. Most preferably, the first organoaluminum is trimethyl aluminum (TMA), triethyl aluminum (TEAL), or triisobutyl aluminum (TiBAL). The premixing can be accomplished by a variety of methods. For example, the supported catalyst can be mixed in a solution containing the organoaluminum. Alternatively, the organoaluminum can be added to the support by an incipient wetness technique.

The premixed catalyst system is injected into a reactor containing an olefin monomer, an activator and a second organoaluminum. The second organoaluminum is also a trialkyl or triaryl aluminum compound, which preferably has the formula $AlR^1{}_3$ where $R^1$ denotes a $C_1$–$C_{20}$ hydrocarbyl, and most preferably is trimethyl aluminum, triethyl aluminum, or triisobutyl aluminum. The second oganoaluminum may be the same as or different from the first organoaluminum.

The process of the invention is also performed in the presence of an activator. Suitable activators include ionic borates and aluminates such as tri(n-butyl)ammonium tetrakis(pentafluorophenyl)borate, trityl tetrakis (pentafluorophenyl)borate or trityl tetrakis (pentafluorophenyl)aluminate. The molar ratio of the metal of the activator component to the transition metal of the single-site catalyst is preferably in the range of about 0.1:1 to 10:1, and more preferably from about 0.3:1 to 3:1.

The process of the invention is used to polymerize olefins, preferably α-olefins. Suitable olefins include, for example, ethylene, propylene, 1-butene, 1-hexene, 1-octene, and the like, and mixtures thereof. The process is valuable for copolymerizing ethylene with α-olefins or di-olefins (e.g., 1,3-butadiene, 1,4-hexadiene, 1,5-hexadiene).

The process of the invention is preferably a liquid phase (slurry, solution, suspension, bulk) process. The pressure in the polymerization reaction zones typically ranges from about 15 psia to about 15,000 psia, and the temperature usually ranges from about −100° C. to about 300° C. Slurry phase processes are preferred. A slurry process involves pressures in the range of about 1 to about 500 atmospheres and temperatures in the range of about −60° C. to about 100° C. The reaction medium employed should be liquid under the conditions of polymerization and relatively inert. Preferably, it is an alkane, a cycloalkane, or an aromatic hydrocarbon such as toluene, ethylbenzene, or xylene. More preferably, hexane or isobutane is employed.

The following examples merely illustrate the invention. Those skilled in the art will recognize many variations that are within the spirit of the invention and scope of the claims.

EXAMPLE 1
Preparation of Catalyst Supported on Triethylboron-Treated Silica

Neat hexamethyldisilazane (HMDS), in an amount equivalent to 12.5 weight percent of the silica, is slowly added to stirring Davison 948 silica and is mixed for 2 hours. The HMDS-treated silica is then dried at 150° C. for 6 hours in a fluidized bed dryer with dry nitrogen gas flow. At room temperature, a heptane solution of triethylboron (TEB, 10 wt. %), in an amount equivalent to 1.68 mL TEB solution per gram of the silica, is slowly added to a heptane slurry of HMDS-treated silica prepared above (2.4 mL heptane/gram silica). The slurry is then refluxed in an oil bath at 100° C. for 6 hours. After cooling to room temperature, the liquid is removed by vacuum and the solid is dried.

A solution of cyclopentadienyl(1-methylboratabenzene) zirconium dichloride (39.9 g, 0.125 mol) and trityl tetrakis (pentafluorophenyl)borate (138 g, 0.149 mol) in toluene (6.51 L) is added to the TEB-modified silica (2.27 kg). The suspension is stirred for 40 minutes, then vacuum dried to give Catalyst 1. Catalyst loading is 0.53 wt. % Zr and 0.20 wt. % B.

EXAMPLE 2
Preparation of Catalyst of Catalyst Supported on HMDS-Treated Silica Neat hexamethyldisilazane (HMDS), in an amount equivalent to 12.5 weight percent of the silica, is slowly added to stirring Davison 948 silica and mixed for 2 hours. The HMDS-treated silica is then dried at 600° C. for 6 hours in a fluidized bed dryer with dry nitrogen gas flow. A solution of cyclopentadienyl(1-methylboratabenzene) zirconium dichloride (13 g, 0.041 mol) and trityl tetrakis (pentafluorophenyl)borate (49.8 g, 0.054 mol) in toluene (450 mL) is added to the HMDS-treated silica (450 g) at room temperature. The mixture is stirred for 40 minutes, then vacuum dried to give Catalyst 2. Catalyst loading is 0.90 wt. % Zr.

COMPARATIVE EXAMPLE 3
Ethylene/Hexene Co-Polymerzation by Catalyst 1 with Organoaluminum Added to Reactor Only Slurry polymerization is conducted in a stirred 1.0-liter, stainless-steel reactor. Polymerization is run at 70° C. and 500 psi. Dry, oxygen-free isobutane (375 mL) is charged to the dry, oxygen-free reactor at room temperature along with 75 mL of 1-hexene and an organoaluminum in the amount and type specified in Table 1. The reactor is heated to 70° C. and allowed to equilibrate. Ethylene is then introduced to give a total pressure of 500 psig, and the reactor is allowed to equilibrate again. The catalyst of Example 1 (20 mg) is then injected into the reactor along with 50 mL of isobutane. Ethylene is then fed to the reactor continuously to maintain a constant pressure. At the end of one hour, ethylene flow is stopped and the reactor is vented to remove the isobutane and unreacted ethylene. The polymer is allowed to dry overnight, and is then weighed.

EXAMPLE 4
Ethylene/Hexene Co-Polymerization by Catalyst 1 with Organoaluminum Added in Both Premixing and Polymerization Steps The polymerization is run according to the same procedure as Comparative Example 3, except that Catalyst 1 is premixed with a heptane solution of organoaluminum (0.4 mol/L AIR$_3$) in the amount and type specified in Table 1. The catalyst is contacted with the organoaluminum solution for 1 hour before addition into the polymerization reactor.

COMPARATIVE EXAMPLE 5
Ethylene/Butene Co-Polymerization by Catalyst 2 with Organoaluminum Added to Premixing Step Only The catalyst of Example 2 is premixed with a heptane solution of organoaluminum (0.4 mol/L TEAL or 0.23 mol/L TiBAL) in the amount and type specified in Table 2. The catalyst is contacted with the organoaluminum solution for 1 hour before addition into the polymerization reactor.

Slurry polymerization is conducted in a stirred 1.0-liter, stainless-steel reactor. Polymerization is run at 70° C. and 400 psi. Dry, oxygen-free isobutane (400 mL) is charged to the dry, oxygen-free reactor at room temperature along with 50 mL of 1-butene (no organoaluminum is added to the reactor in this comparative example). The reactor is heated to 70° C. and allowed to equilibrate. Ethylene is then introduced to give a total pressure of 400 psig, and the reactor is allowed to equilibrate again. The pre-mixed catalyst is then injected into the reactor along with 50 mL of isobutane. Ethylene is then fed to the reactor continuously to maintain a constant pressure. At the end of one hour, ethylene flow is stopped and the reactor is vented to remove the isobutane and unreacted ethylene. The polymer is allowed to dry overnight and is then weighed.

EXAMPLE 6
Ethylene/Butene Co-Polymerization by Catalyst 2 with Organoaluminum Added in Both Pre-Alkylation and Polymerization Steps The polymerization is run according to the same procedure as Comparative Example 5, except that an organoaluminum in the amount and type specified in Table 2 is added to the reactor with the isobutane prior to polymerization. In Examples 6D–H, the premixing step is performed by an incipient wetness method where the organoaluminum solution is added to Catalyst 2 (1.5 mL solution per gram of catalyst), then the residual solvent is evaporated at room temperature. The premixed catalysts in Examples 6D–H are stored overnight before use. The catalyst and organoaluminum are premixed for 30 minutes in Example 6B and for 1 hour in Examples 6A, 6C, and 6I.

COMPARATIVE EXAMPLE 7

Ethylene/Butene Co-Polymerization by Metallocene Catalyst

Neat hexamethyldisilazane (HMDS), in an amount equivalent to 12.5 weight percent of the silica, is slowly added to stirring Davison 948 silica and mixed for 2 hours. The HMDS-treated silica is then dried at 600° C. for 6 hours in a fluidized bed dryer with dry nitrogen gas flow. A solution of $Cp_2ZrCl_2$ (23 mg, 0.080 mmol) and trityl tetrakis (pentafluorophenyl)borate (92 mg, 0.10 mmol) in toluene (1.5 mL) is added via incipient wetness to the HMDS-treated silica (1.0 g) at room temperature. The catalyst is then vacuum dried to give Comparative Catalyst 3. Catalyst loading is 0.66 wt. % Zr.

Polymerization runs using Comparative Catalyst 3 are run with and without pre-mixing the supported metallocene catalyst with a heptane solution of TEAL. Run 7A is conducted without the pre-mixing step. Run 7B is conducted after pre-mixing TEAL (0.4 mol/L, Al:Zr=135) and Comparative Catalyst 3 for 1 hour before addition into the polymerization reactor.

Slurry polymerization is conducted in a stirred 1.0-liter, stainless-steel reactor. Polymerization is run at 70° C. and 400 psi. Dry, oxygen-free isobutane (400 mL) is charged to the dry, oxygen-free reactor at room temperature along with 50 mL of 1-butene and TEAL in the amount specified in Table 3. The reactor is heated to 70° C. and allowed to equilibrate. Ethylene is then introduced to give a total pressure of 400 psig, and the reactor is allowed to equilibrate again. The catalyst is then injected into the reactor along with 50 mL of isobutane. Ethylene is then fed to the reactor continuously to maintain a constant pressure. At the end of one hour, ethylene flow is stopped and the reactor is vented to remove the isobutane and unreacted ethylene.

The examples show a significant broadening of polymer MWD for the process of the invention. Broader polyolefin MWD is seen when organoaluminums are added in both the premixing and polymerization steps, compared to organoaluminum addition to the reactor only (see Table 1). Copending U.S. application Ser. No. 09/318,009 also shows low MWD for polyolefins formed in a process where organoaluminum is added to the reactor only. Also, organoaluminum addition during the premixing step only also typically results in lower MWD (see Table 2). Interestingly, although this broadening of MWD is seen with catalysts that contain boraaryl ligands, conventional metallocenes show no broadening when organoaluminums are used in both pre-mixing and in the reactor (see Table 3).

Additionally, the examples show that broad and bimodal MWD polyolefins can be produced under certain conditions. Examples 4B and 6C show that pre-mixing the catalyst with a large amount of TiBAL results in bimodal MWD polymers when TEAL is used in the reactor, whereas premixing with only a small amount of TiBAL in Example 6D does not produce bimodal polymers. Examples 6E and 6F show pre-mixing the catalyst with a small amount of TEAL results in bimodal MWD polymers when TiBAL is used in the reactor, whereas premixing with a large amount of TEAL in Example 4D does not produce bimodal polymers. Thus, a process to produce bimodal polymers comprises premixing TiBAL and a boraaryl-containing organometallic compound where the Al:Zr ratio in the premixing step is greater than about 100:1, followed by olefin polymerization in the presence of the premixed catalyst, an activator and a different organoaluminum (i.e., not TiBAL). Another process to produce bimodal polymers comprises premixing TEAL and a boraaryl-containing organometallic compound where the Al:Zr ratio in the premixing step is less than about 20:1, followed by olefin polymerization in the presence of the premixed catalyst, an activator and a different organoaluminum (i.e., not TEAL).

TABLE 1

Ethylene/Hexene Polymerization Results with Catalyst 1

| Run # | Pre-Alkylation Conditions | | In reactor Organoaluminum Conditions | | Activity | |
|---|---|---|---|---|---|---|
| | $AIR_3$ | Al/Zr molar ratio | $AIR_3$ | Al/Zr molar ratio | (g PE/g cat/h) | MWD |
| *3A[a] | — | — | TEAL | 360 | 1135 | 3.4 |
| *3B | — | — | TiBAL | 360 | 980 | 2.5 |
| 4A[a] | TEAL | 180 | TEAL | 180 | 1540 | 4.4 |
| 4B[a] | TiBAL | 180 | TEAL | 180 | 2195 | 8.9[b] |
| 4C[a] | TiBAL | 180 | TiBAL | 180 | 4380 | 11.5[b] |
| 4D[a] | TEAL | 180 | TiBAL | 180 | 1480 | 6.1 |

*Comparative Example
[a]Average of 2 runs.
[b]Bimodal MWD.

TABLE 2

Ethylene/Butene Polymerization Results with Catalyst 2

| Run # | Pre-Alkylation Conditions | | In reactor Organoaluminum Conditions | | Activity | |
|---|---|---|---|---|---|---|
| | $AIR_3$ | Al/Zr molar ratio | $AIR_3$ | Al/Zr molar ratio | (g PE/g cat/h) | MWD |
| *5A | TiBAL | 260 | — | — | 5140 | 5.8 |
| 6A | TiBAL | 180 | TiBAL | 90 | 8400 | 9.6 |
| 6B | TiBAL | 70[a] | TiBAL | 130 | 6660 | 6.0 |
| 6C | TiBAL | 210 | TEAL | 90 | 1655 | 10.7[c] |
| 6D | TiBAL[b] | 8[b] | TEAL | 270 | 2015 | 5.8 |
| 6E | TEAL[b] | 2 | TiBAL | 270 | 1545 | 13.1 |
| 6F | TEAL[b] | 8[b] | TiBAL | 270 | 850 | 11.5[c] |
| 6G | TEAL[b] | 2[b] | TEAL | 270 | 2285 | 8.0 |
| 6H | TEAL[b] | 8[b] | TEAL | 270 | 1310 | 9.8 |
| 6I | TEAL | 150 | TEAL | 75 | 1540 | 7.2 |

*Comparative Example
[a]Premixed for only 30 minutes instead of 1 hour.
[b]Premixing performed by incipient wetness method.
[c]Bimodal MWD.

TABLE 3

Ethylene/Butene Polymerization Results with Conventional Metallocene

| Run # | Pre-Alkylation Conditions | | In reactor Organoaluminum Conditions | | Activity | |
|---|---|---|---|---|---|---|
| | $AIR_3$ | Al/Zr molar ratio | $AIR_3$ | Al/Zr molar ratio | (g PE/g cat/h) | MWD |
| *7A | — | — | TEAL | 270 | 1055 | 3.4 |
| *7B | TEAL | 135 | TEAL | 135 | 2275 | 3.4 |

*Comparative Example

I claim:

1. A process for polymerizing olefins to form a polyolefin product which comprises:

(a) preparing a catalyst system by premixing a first organoaluminum selected from the group consisting of triisobutylaluminum and triethylaluminum with a supported catalyst comprising a support and an organometallic compound comprising zirconium and at least one boraaryl ligand, wherein the catalyst system has an aluminum:zirconium ratio greater than about 100:1 when the first organoaluminum is triisobutylaluminum and the catalyst system has an aluminum:zirconium ratio less than about 20:1 when the first organoaluminum is triethylaluminum; and (b) polymerizing an olefin in the presence of the catalyst system, an activator and a second organoaluminum, wherein the second organoaluminum is different from the first organoaluminum;

wherein the polyolefin product is a bimodal molecular weight distribution polyolefin.

2. The process of claim 1 wherein the second organoaluminum is trimethyl aluminum or triethyl aluminum when the first organoaluminum is triisobutylaluminum.

3. The process of claim 1 wherein the second organoaluminum is trimethyl aluminum or triisobutylaluminum when the first organoaluminum is triethyl aluminum.

4. The process of claim 1 wherein the support is selected from the group consisting of silicas, aluminas, silica-aluminas, titanias, zirconias, magnesias, magnesium chloride, polystyrene, and mixtures thereof.

5. The process of claim 1 wherein the support is calcined at a temperature greater than 150° C. prior to addition of the organometallic compound.

6. The process of claim 1 wherein the support is silylated.

7. The process of claim 5 wherein the support is further treated with an organoboron compound.

8. The process of claim 1 wherein the activator is selected from the group consisting of ionic borates and ionic aluminates.

9. The process of claim 1 wherein the olefin is ethylene or a mixture of ethylene and a $C_3$–$C_{10}$ α-olefin.

* * * * *